(12) United States Patent
Chiang et al.

(10) Patent No.: US 8,896,487 B2
(45) Date of Patent: Nov. 25, 2014

(54) CAVITY ANTENNAS FOR ELECTRONIC DEVICES

(75) Inventors: Bing Chiang, Melbourne, FL (US);
Douglas B. Kough, San Jose, CA (US);
Enrique Ayala Vazquez, Watsonville, CA (US); Gregory A. Springer, Sunnyvale, CA (US); Hao Xu, Cupertino, CA (US); Robert W. Schlub, Cupertino, CA (US); Eduardo Lopez Camacho, Watsonville, CA (US); Mattia Pascolini, Campbell, CA (US); Jerzy Guterman, Mountain View, CA (US); Yi Jiang, Cupertino, CA (US); Rodney Andres Gomez Angulo, Sunnyvale, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 854 days.

(21) Appl. No.: 12/500,570

(22) Filed: Jul. 9, 2009

(65) Prior Publication Data
US 2011/0006953 A1    Jan. 13, 2011

(51) Int. Cl.
*H01Q 1/24* (2006.01)
*H01Q 1/38* (2006.01)
*G06F 1/16* (2006.01)
*H01Q 1/22* (2006.01)
*H01Q 13/18* (2006.01)

(52) U.S. Cl.
CPC .............. *H01Q 13/18* (2013.01); *G06F 1/1616* (2013.01); *G06F 1/1626* (2013.01); *H01Q 1/38* (2013.01); *H01Q 1/2266* (2013.01); *G06F 1/1698* (2013.01)
USPC .................................... 343/702; 343/700 MS

(58) Field of Classification Search
USPC ......................................................... 343/702
See application file for complete search history.

(56) References Cited

U.S. PATENT DOCUMENTS 2,834,959 A    5/1958 Dorne
3,312,976 A    4/1967 Gregory
(Continued)

FOREIGN PATENT DOCUMENTS

EP    0892461    1/1999
EP    2178158 A1    4/2010
(Continued)

OTHER PUBLICATIONS

R. Bancroft "A Commercial Perspective on the Development and Integration of an 802.11a/b/g HiperLan/WLAN Antenna into Laptop Computers", IEEE Antennas and Propagation Magazine, vol. 48, No. 4, Aug. 2006, pp. 12-18.

(Continued)

*Primary Examiner* — Graham Smith
(74) *Attorney, Agent, or Firm* — Treyz Law Group; G. Victor Treyz; Michael H. Lyons

(57) ABSTRACT

Antennas are provided for electronic devices such as portable computers. An electronic device may have a housing in which an antenna is mounted. The housing may have an antenna window for the antenna. The antenna window may be formed from dielectric or from antenna window slots in a conductive member such as a conductive wall of the electronic device housing. An antenna may have an antenna resonating element that is backed by a conductive antenna cavity. The antenna resonating element may have antenna resonating element slots or may be formed using other antenna configurations such as inverted-F configurations. The antenna cavity may have conductive vertical sidewalls and a conductive rear wall. The antenna cavity walls may be formed from conductive layers on a dielectric antenna support structure.

21 Claims, 17 Drawing Sheets

(56) References Cited

U.S. PATENT DOCUMENTS

| | | | |
|---|---|---|---|
| 3,633,207 | A | 1/1972 | Ingerson et al. |
| 4,208,660 | A | 6/1980 | McOwen |
| 4,245,222 | A | 1/1981 | Eng et al. |
| 4,371,877 | A | 2/1983 | Doussot et al. |
| 4,733,245 | A | 3/1988 | Mussler |
| 4,924,236 | A * | 5/1990 | Schuss et al. .......... 343/700 MS |
| 5,218,374 | A | 6/1993 | Koert et al. |
| 5,394,160 | A * | 2/1995 | Iwasaki et al. ................ 343/702 |
| 5,446,789 | A * | 8/1995 | Loy et al. .................. 379/433.12 |
| 5,489,913 | A | 2/1996 | Raguenet et al. |
| 5,648,786 | A | 7/1997 | Chung et al. |
| 6,127,987 | A | 10/2000 | Maruyama et al. |
| 6,198,453 | B1 | 3/2001 | Chew |
| 6,225,959 | B1 | 5/2001 | Gordon |
| 6,342,864 | B1 | 1/2002 | Muramoto et al. |
| 6,429,825 | B1 | 8/2002 | Martek |
| 6,639,560 | B1 | 10/2003 | Kadambi et al. |
| 6,646,605 | B2 | 11/2003 | McKinzie et al. |
| 6,677,879 | B1 | 1/2004 | Nix et al. |
| 6,806,839 | B2 | 10/2004 | Lo |
| 6,812,892 | B2 | 11/2004 | Tai et al. |
| 6,831,607 | B2 | 12/2004 | Hebron et al. |
| 6,879,293 | B2 * | 4/2005 | Sato ................ 343/702 |
| 6,894,650 | B2 | 5/2005 | Darden et al. |
| 7,126,553 | B1 | 10/2006 | Fink et al. |
| 7,283,095 | B2 * | 10/2007 | Karanik et al. ........ 343/700 MS |
| 7,345,634 | B2 | 3/2008 | Ozkar et al. |
| 2001/0053677 | A1 | 12/2001 | Schiffer |
| 2002/0145567 | A1 * | 10/2002 | Spiegel et al. ......... 343/700 MS |
| 2003/0164800 | A1 | 9/2003 | Jordan et al. |
| 2004/0075611 | A1 | 4/2004 | Kenoun et al. |
| 2004/0104849 | A1 * | 6/2004 | Tai et al. ............. 343/700 MS |
| 2004/0113860 | A1 * | 6/2004 | Walton ................ 343/872 |
| 2004/0227679 | A1 * | 11/2004 | Lu ................ 343/702 |
| 2006/0244663 | A1 | 11/2006 | Fleck et al. |
| 2007/0120740 | A1 | 5/2007 | Iellici et al. |
| 2007/0216594 | A1 | 9/2007 | Uno et al. |
| 2008/0029886 | A1 * | 2/2008 | Cotte et al. ................ 257/728 |
| 2008/0150691 | A1 * | 6/2008 | Knadle et al. ............. 340/10.1 |
| 2009/0153410 | A1 | 6/2009 | Chiang et al. |
| 2009/0153412 | A1 | 6/2009 | Chiang et al. |
| 2010/0073241 | A1 | 3/2010 | Vazquez et al. |

FOREIGN PATENT DOCUMENTS

| | | |
|---|---|---|
| GB | 655045 | 7/1951 |
| GB | 2230902 A | 10/1990 |
| GB | 2299213 A | 9/1996 |
| GB | 2413014 | 12/2005 |
| GB | 2444360 A | 4/2008 |
| JP | H1093332 | 4/1998 |
| JP | 2000068736 | 3/2000 |
| WO | 2004062035 | 7/2004 |
| WO | 2006/118587 | 11/2006 |
| WO | 2009133448 | 5/2009 |
| WO | 2009/079032 | 6/2009 |

OTHER PUBLICATIONS

Ayala Vazquez et al., U.S. Appl. No. 12/553,944, filed Sep. 3, 2009.
Bevelacqua et al., U.S. Appl. No. 12/750,661, filed Mar. 30, 2010.
Shiu et al., U.S. Appl. No. 12/750,660, filed Mar. 30, 2010.
Guterman et al., U.S. Appl. No. 12/553,943, filed Sep. 3, 2009.
Ayala Vazquez et al., U.S. Appl. No. 12/486,496, filed Jun. 17, 2009.
Vazquez et al., U.S. Appl. No. 12/238,384, filed Sep. 25, 2008.
Chiang et al., U.S. Appl. No. 12/104,359, filed Apr. 16, 2008.
Chiang, U.S. Appl. No. 12/356,496, filed Jan. 20, 2009.
Chiang et al., U.S. Appl. No. 12/401,599, filed Mar. 10, 2009.
Kotani et al: "A rectangular cavity backed slot antenna with parasitic slots", IEEE Antennas and Propagation Society International Symposium. 2001 Digest. Aps. Boston, MA, Jul. 8-13, 2001; vol. 3, Jul. 8, 2001, pp. 166-169.

* cited by examiner

CAVITY ANTENNAS FOR ELECTRONIC DEVICES

BACKGROUND

This relates generally to antennas, and, more particularly, to antennas for electronic devices.

Electronic devices such as portable computers and handheld electronic devices are becoming increasingly popular. Devices such as these are often provided with wireless communications capabilities. For example, electronic devices may use long-range wireless communications circuitry such as cellular telephone circuitry to communicate using cellular telephone bands at 850 MHz, 900 MHz, 1800 MHz, and 1900 MHz (e.g., the main Global System for Mobile Communications or GSM cellular telephone bands). Long-range wireless communications circuitry may also be used handle the 2100 MHz band and other bands. Electronic devices may use short-range wireless communications links to handle communications with nearby equipment. For example, electronic devices may communicate using the WiFi® (IEEE 802.11) bands at 2.4 GHz and 5 GHz (sometimes referred to as local area network bands) and the Bluetooth® band at 2.4 GHz.

It can be difficult to incorporate antennas successfully into an electronic device. Some electronic devices are manufactured with small form factors, so space for antennas is limited. In many electronic devices, the presence of electronic components in the vicinity of an antenna serves as a possible source of electromagnetic interference. Antenna operation can also be blocked by conductive structures. This can make it difficult to implement an antenna in an electronic device that contains conductive housing walls or other conductive structures that can potentially block radio-frequency signals.

It would therefore be desirable to be able to provide improved antennas for wireless electronic devices.

SUMMARY

Antennas may be provided for electronic devices. The electronic devices may be portable devices such as portable computers or cellular telephones.

An electronic device may be provided with a housing. The housing may contain conductive portions such as conductive walls. An antenna for the electronic device may be mounted in the housing. The antenna may be provided with an antenna cavity. The antenna cavity may be formed from a layer of conductive material on a plastic support structure. The antenna cavity may have vertical sidewalls and a planar rear wall. The conductive material may be a metal such as copper.

The antenna may have an antenna resonating element. The antenna resonating element may be configured to cover multiple communications bands of interest. For example, the antenna resonating element may be configured to cover communications bands at 2.4 GHz and 5 GHz.

The antenna resonating element may be located in the antenna cavity. The resonating element may be formed from a layer of conductive material such as metal on a substrate. The substrate may be a printed circuit board such as a flexible or rigid printed circuit board. The layer of conductive material on the printed circuit board may be configured to form one or more antenna resonating element antenna slots. The antenna resonating element slots may include open and closed slots. The layer of conductive material on the printed circuit board may also be configured to form an inverted-F antenna resonating element. With this type of configuration, a conductive trace on the printed circuit board may be patterned to form a main resonating element arm and multiple antenna resonating element branches.

The antenna may be provided with an antenna window. The antenna window may be formed from dielectric in an opening in the housing of the electronic device. The antenna window may also be formed from a plurality of slots in the conductive walls of the housing. Slot-based antenna windows such as these may be formed on a curved portion of a portable computer lid or other suitable housing structures.

Further features of the invention, its nature and various advantages will be more apparent from the accompanying drawings and the following detailed description of the preferred embodiments.

DETAILED DESCRIPTION

Figure 1A:
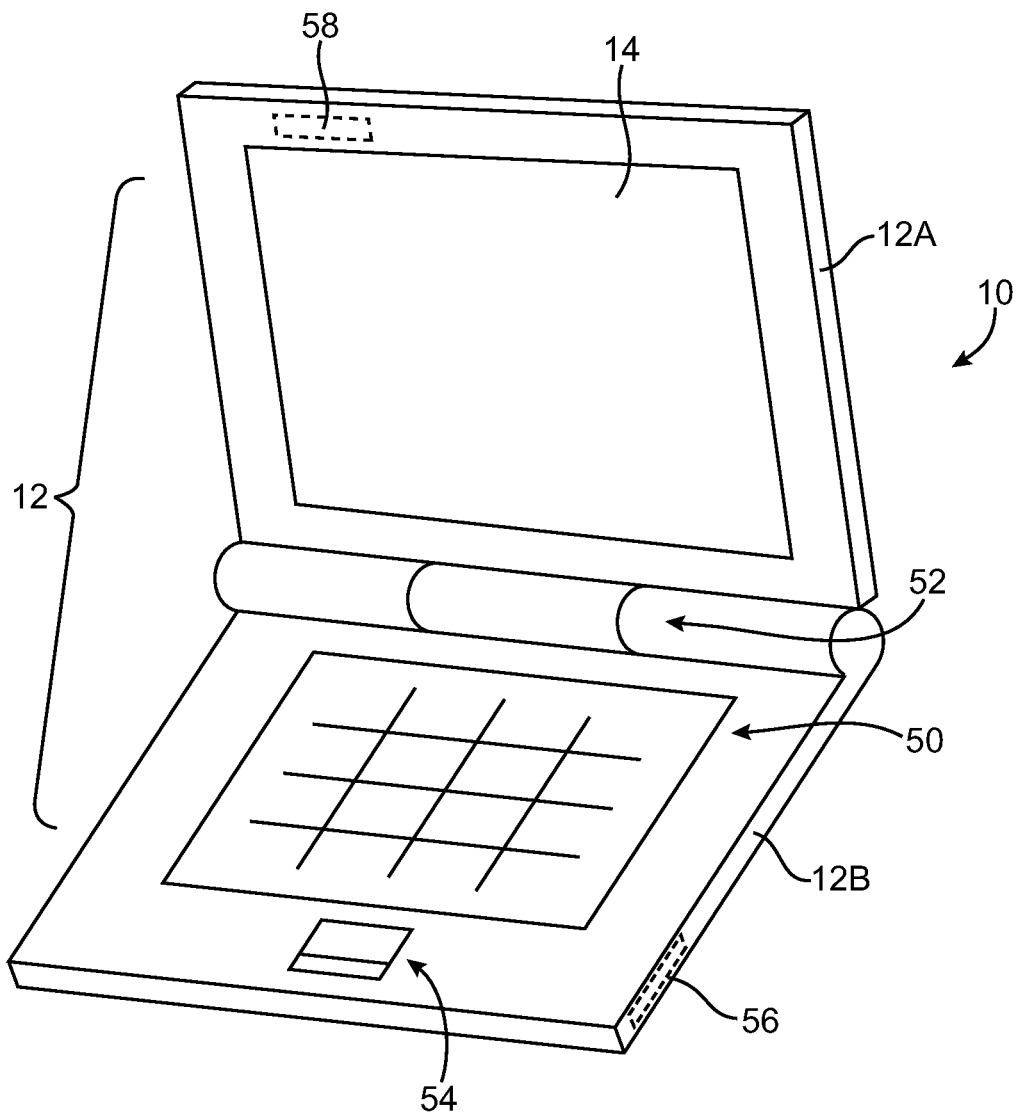
FIG. 1A is a front perspective view of an illustrative electronic device with an antenna in accordance with an embodiment of the present invention.

Electronic devices may be provided with wireless communications circuitry. The wireless communications circuitry may be used to support wireless communications in one or more wireless communications bands. Antenna structures in an electronic device may be used in transmitting and receiving radio-frequency signals. For example, single band and multiband antennas may be formed. Each antenna may have an antenna resonating element. The antenna resonating elements may be based on inverted-F designs, slot configurations, or other antenna resonating element arrangements. Antennas may be provided with antenna cavities. The antenna cavities may help to isolate the antennas from nearby electronic components in an electronic device and may help to improve antenna efficiency. Antennas may be mounted behind antenna windows. The antenna windows may be formed from slots in conductive structures.

Any suitable electronic devices may be provided with antennas. As an example, antennas may be formed in electronic devices such as desktop computers, portable computers such as laptop computers and tablet computers, handheld electronic devices such as cellular telephones, etc. With one suitable configuration, which is sometimes described herein as an example, antennas are formed in relatively compact electronic devices in which interior space can be valuable. These compact devices may be portable electronic devices.

Portable electronic devices that may be provided with antennas include laptop computers and small portable computers such as ultraportable computers, netbook computers, and tablet computers. Portable electronic devices may also be somewhat smaller devices. Examples of smaller portable electronic devices that may be provided with antennas include wrist-watch devices, pendant devices, headphone and earpiece devices, and other wearable and miniature devices. With one suitable arrangement, the portable electronic devices may be handheld electronic devices such as cellular telephones.

Space is at a premium in portable electronic devices and housings for these devices are sometimes constructed from conductive materials that block antenna signals. Arrangements in which antenna structures are formed behind an antenna window can help address these challenges. It may be desirable to form the antenna window in the conductive housing of the portable electronic device. Antenna windows may be formed in conductive housing walls by forming a dielectric antenna window structure in the conductive housing wall. If desired, slot-based antenna windows may be formed in conductive housing walls. In a slot-based antenna window, the window region is defined by a pattern of window slots.

An antenna resonating element and, if desired, an antenna cavity, may be formed under the antenna window. During operation, radio-frequency signals for the antenna can pass through the antenna window. The antenna cavity may help to isolate the antenna from surrounding electronic components.

Antennas with configurations such as these can be mounted on any suitable exposed portion of a portable electronic device. For example, antennas can be provided on the front or top surface of the device. In a handheld device or other device in which the rear of the device may be exposed during operation, it may be acceptable to form an antenna window on the rear device surface. Other configurations are also possible (e.g., with antennas mounted in more confined locations, on device sidewalls, etc.). The use of antenna mounting locations such as a top or rear surface is sometimes described herein as an example, but, in general, any suitable antenna mounting location may be used in an electronic device if desired.

Handheld devices that may be provided with antennas include cellular telephones, media players with wireless communications capabilities, handheld computers (also sometimes called personal digital assistants), remote controllers, global positioning system (GPS) devices, and handheld gaming devices. Handheld devices and other portable devices may include the functionality of multiple conventional devices. As an example, a handheld device with cellular telephone functions may include computing equipment resources that allow the handheld device to run games, media player applications, web browsers, productivity software, and other code.

An illustrative portable device such as a portable computer that may include an antenna is shown in FIG. 1. As shown in FIG. 1, device 10 may be a portable computer having a housing such as housing 12. Housing 12 may have an upper portion such as upper housing 12A, which is sometimes referred to as the lid or cover. Housing 12 may also have a lower portion such as lower housing 12B, which is sometimes referred to as the housing base or main unit. Housing portions 12A and 12B may be pivotably attached to each other using a hinge structure such as hinge 52 (sometimes referred to as a clutch barrel hinge). A display such as display 14 may be mounted to the inner surface of upper housing 12A. Other components such as keyboard 50 and touch pad 54 may be mounted in lower housing 12B.

Housing 12, which is sometimes referred to as a case, may be formed of any suitable materials including plastic, wood, glass, ceramics, metal, or other suitable materials, or a combination of these materials. In some situations, portions of housing 12 may be formed from a dielectric or other low-conductivity material, so as not to disturb the operation of conductive antenna elements that are located in proximity to housing 12. In other situations, housing 12 may be formed from metal elements. An advantage of forming housing 12 from metal or other structurally sound conductive materials is that this may improve device aesthetics and may help improve durability and portability.

Particularly in configurations for device 10 in which some or all of housing 12 is formed from conductive materials, it may be advantageous to form an antenna for device 10 that has an antenna window. With this type of configuration, one or more of the antennas for device 10 may be hidden from view behind a dielectric member that serves as the antenna window. Antenna windows may also be formed from a pattern of slots in a conductive housing wall. When the slots are concealed sufficiently (e.g., by forming narrow slots or by covering the slots with an opaque dielectric to hide the slots from view), the antenna window will be hidden from view, thereby enhancing the aesthetics of the electronic device.

Figure 1B:
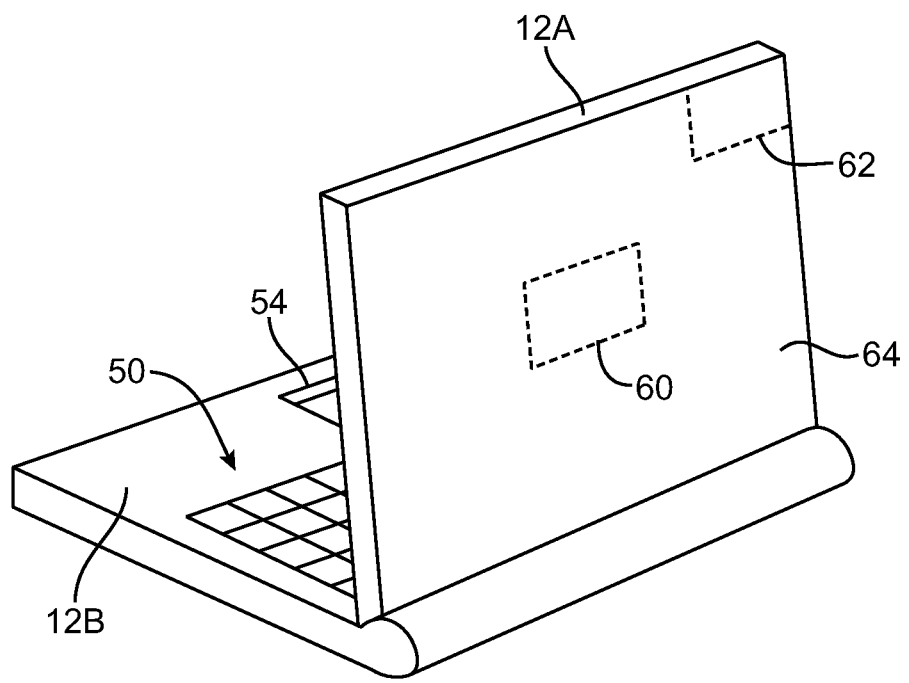
FIG. 1B is a rear perspective view of an illustrative electronic device of the type shown in FIG. 1A with an antenna in accordance with an embodiment of the present invention.

Suitable locations for an antenna in device 10 of FIG. 1 include region 58 and region 56. Region 58 is located on the edge of display 14. Region 56 is located on the right front side of lower housing portion 12B. As shown in FIG. 1B, antennas can also be located on regions such as region 60 and region 62. Region 60 is located in the middle of the top surface of the lid of device 10. Region 62 is located in the corner of the lid. Other antenna locations may be used if desired (e.g., on the rear of device 10, on the front of device 10, on an exterior surface (e.g., the top of a lid), on an interior surface such as a surface adjacent to keys 50, etc.

Figure 2A:
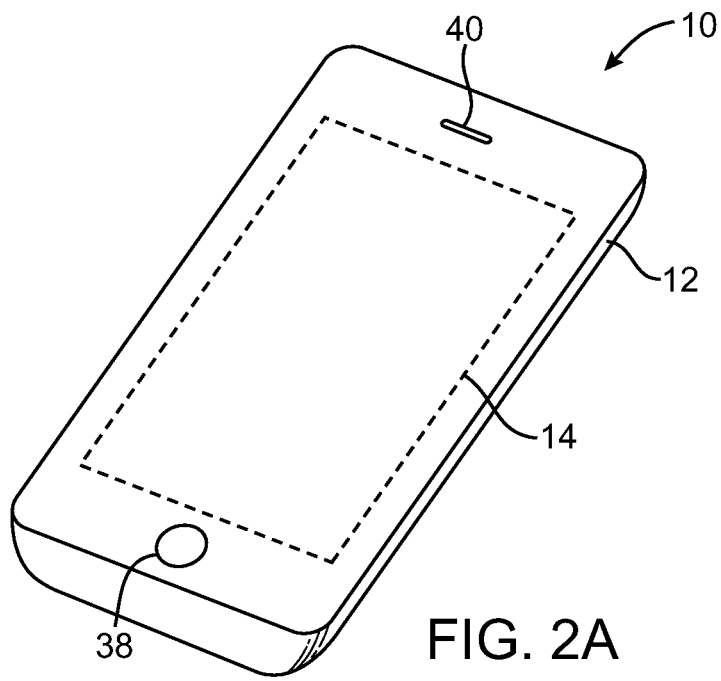
FIG. 2A is a front perspective view of another illustrative electronic device with an antenna in accordance with an embodiment of the present invention.
Figure 2B:
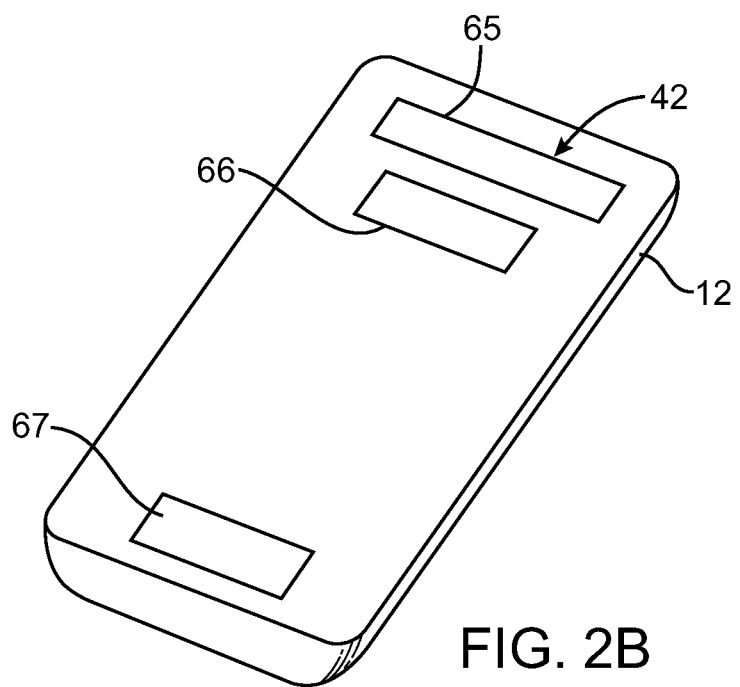
FIG. 2B is a rear perspective view of an electronic device of the type shown in FIG. 2A in accordance with an embodiment of the present invention.

Another illustrative electronic device is shown in FIGS. 2A and 2B. In the example of FIGS. 2A and 2B, device 10 is a handheld electronic device such as a handheld device with cellular telephone capabilities. As shown in FIG. 2A, device 10 may have housing 12. Housing 12 may be formed from plastic, metal, other suitable dielectric materials, other suitable conductive materials, or combinations of such materials. A display such as display 14 may be provided on the front face of device 10. Display 14 of FIG. 2A may be a touch screen display (as an example). Device 10 may have a speaker port 40 and other input-output ports. One or more buttons such as button 38 and other user input devices may be used to gather user input. As shown in FIG. 2B, an antenna may be mounted in region 66. Other suitable locations include regions 65 and 67. These are merely illustrative examples. Antennas may, in general, be mounted in any suitable location within an electronic device.

Figure 3:
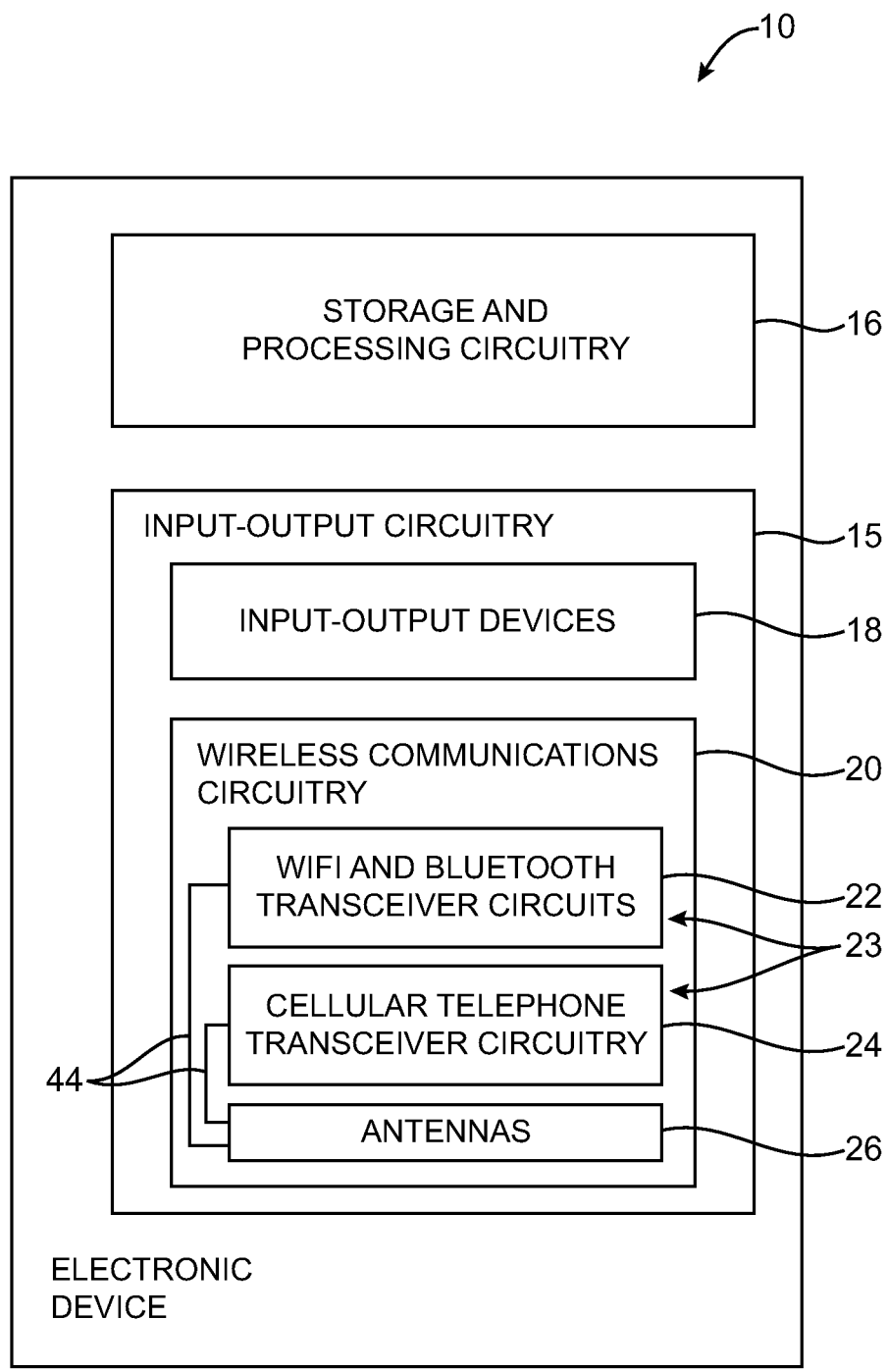
FIG. 3 is a schematic diagram of an illustrative electronic device with antenna structures in accordance with an embodiment of the present invention.

A schematic diagram of device 10 showing how device 10 may include one or more antennas 26 and transceiver circuits that communicate with antennas 26 is shown in FIG. 3. Electronic device 10 of FIG. 3 may be a portable computer such as a laptop computer, a portable tablet computer, a mobile telephone, a mobile telephone with media player capabilities, a handheld computer, a remote control, a game player, a global positioning system (GPS) device, a desktop computer, a combination of such devices, or any other suitable electronic device.

As shown in FIG. 3, electronic device 10 may include storage and processing circuitry 16. Storage and processing circuitry 16 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 16 may be used to control the operation of device 10. Processing circuitry 16 may be based on a processor such as a microprocessor and other suitable integrated circuits. With one suitable arrangement, storage and processing circuitry 16 may be used to run software on device 10, such as internet browsing applications, voice-over-internet-protocol (VOIP) telephone call applications, email applications, media playback applications, operating system functions, etc. Storage and processing circuitry 16 may be used in implementing suitable communications protocols. Communications protocols that may be implemented using storage and processing circuitry 16 include internet protocols, wireless local area network protocols (e.g., IEEE 802.11 protocols—sometimes referred to as WiFi®), protocols for other short-range wireless communications links such as the Bluetooth® protocol, etc.

Input-output circuitry 15 may be used to allow data to be supplied to device 10 and to allow data to be provided from device 10 to external devices. Input-output devices 18 such as touch screens and other user input interface are examples of input-output circuitry 15. Input-output devices 18 may also include user input-output devices such as buttons, joysticks, click wheels, scrolling wheels, touch pads, key pads, keyboards, microphones, cameras, etc. A user can control the operation of device 10 by supplying commands through such user input devices. Display and audio devices may be included in devices 18 such as liquid-crystal display (LCD) screens, light-emitting diodes (LEDs), organic light-emitting diodes (OLEDs), and other components that present visual information and status data. Display and audio components in input-output devices 18 may also include audio equipment such as speakers and other devices for creating sound. If desired, input-output devices 18 may contain audio-video interface equipment such as jacks and other connectors for external headphones and monitors.

Wireless communications circuitry 20 may include radio-frequency (RF) transceiver circuitry 23 formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Wireless communications circuitry 20 may include radio-frequency transceiver circuits for handling multiple radio-frequency communications bands. For example, circuitry 20 may include transceiver circuitry 22 that handles 2.4 GHz and 5 GHz bands for WiFi (IEEE 802.11) communications and the 2.4 GHz Bluetooth communications band. Circuitry 20 may also include cellular telephone transceiver circuitry 24 for handling wireless communications in cellular telephone bands such as the GSM bands at 850 MHz, 900 MHz, 1800 MHz, and 1900 MHz, and the 2100 MHz data band (as examples). Wireless communications circuitry 20 can include circuitry for other short-range and long-range wireless links if desired. For example, wireless communications circuitry 20 may include global positioning system (GPS) receiver equipment, wireless circuitry for receiving radio and television signals, paging circuits, etc. In WiFi and Bluetooth links and other short-range wireless links, wireless signals are typically used to convey data over tens or hundreds of feet. In cellular telephone links and other long-range links, wireless signals are typically used to convey data over thousands of feet or miles.

Wireless communications circuitry 20 may include antennas 26. Some or all of antennas 26 may be cavity-backed antennas. A cavity-backed antenna includes an antenna cavity and an associated antenna resonating element. The cavity may, for example, be a substantially rectangular cavity with vertical conductive sidewalls and a planar rear surface (as an example). Antennas 26 may, if desired, include antenna windows. The antenna windows for antennas 26 may include dielectric antenna window structures and slot-based antenna windows.

Antennas 26 may be single band antennas that each cover a particular desired communications band or may be multiband antennas. A multiband antenna may be used, for example, to cover multiple cellular telephone communications bands. If desired, a dual band antenna may be used to cover two WiFi bands (e.g., 2.4 GHz and 5 GHz). Different types of antennas may be used for different bands and combinations of bands. For example, it may be desirable to form a dual band antenna for forming a local wireless link antenna, a multiband antenna for handling cellular telephone communications bands, and a single band antenna for forming a global positioning system antenna (as examples).

Transmission line paths 44 may be used to convey radio-frequency signals between transceivers 22 and 24 and antennas 26. Radio-frequency transceivers such as radio-frequency transceivers 22 and 24 may be implemented using one or more integrated circuits and associated components (e.g., switching circuits, matching network components such as discrete inductors, capacitors, and resistors, and integrated circuit filter networks, etc.). These devices may be mounted on any suitable mounting structures. With one suitable arrangement, transceiver integrated circuits may be mounted on a printed circuit board. Paths 44 may be used to interconnect the transceiver integrated circuits and other components on the printed circuit board with antenna structures in device 10. Paths 44 may include any suitable conductive pathways over which radio-frequency signals may be conveyed including transmission line path structures such as coaxial cables, microstrip transmission lines, etc.

Antennas 26 may, in general, be formed using any suitable antenna types. Examples of suitable antenna types for antennas 26 include antennas with resonating elements that are formed from patch antenna structures, inverted-F antenna structures, closed and open slot antenna structures, loop antenna structures, monopoles, dipoles, planar inverted-F antenna structures, hybrids of these designs, etc. All or part of each antenna may be formed from a conductive portion of housing 12. For example, housing 12 or a part of housing 12 may serve as a conductive ground plane for an antenna. A conductive antenna cavity that is formed from part of housing 12, an associated housing structure, or a separate cavity structure may be shorted to the conductive ground plane.

Figure 4:
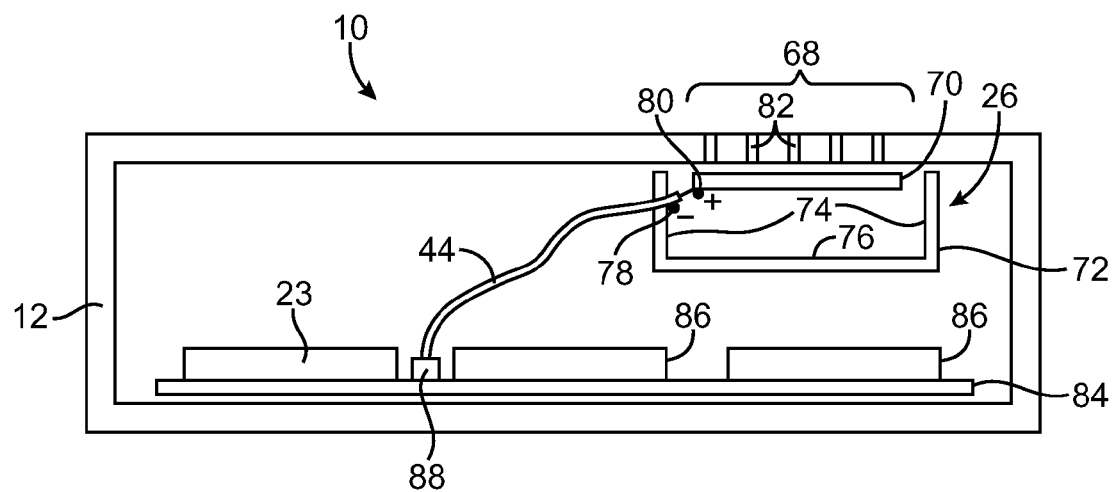
FIG. 4 is a cross-sectional side view of an illustrative electronic device with an antenna in accordance with an embodiment of the present invention.

A cross-sectional view of an illustrative electronic device that contains a cavity-backed antenna located below a slot-based antenna window is shown in FIG. 4. As shown in FIG. 4, antenna 26 may have an antenna cavity 72 and antenna resonating element 70. Antenna 26 may operate by transmitting and receiving radio-frequency antenna signals though antenna window 68.

Antenna cavity 72 may be formed from conductive cavity surfaces such as conductive vertical cavity walls 74 and planar conductive cavity wall 76. There may, for example, be five conductive cavity walls in cavity 72. Four conductive vertical sidewalls may be connected to planar rear wall 76. Antenna resonating element 70 may be located on the open side of cavity 72. Antenna resonating element 70 may contain conductive antenna structures. These conductive antenna structures may be formed from wire, metal foil, portions of housing 12, conductive support members, or other conductive materials.

With one suitable arrangement, the conductive structures for antenna resonating element 70 may be formed from conductive traces on a dielectric support. The conductive traces may be formed from copper or other metals (as an example). The dielectric support may be a printed circuit board or a plastic member. The printed circuit board may be rigid or flexible. Rigid printed circuit boards may be formed from epoxy (e.g., FR4) or other dielectric substrates. Flexible printed circuit boards ("flex circuits") may be formed from flexible polymer sheets such as polyimide sheets or other flexible dielectrics.

Antenna 26 may be fed at positive antenna feed terminal 80 and ground antenna feed terminal 78. Feed terminal 80 may be coupled to traces on the support structure for antenna resonating element 70. Antenna feed terminal 78 may be shorted to conductive antenna cavity 72 and other antenna ground structures (e.g., portions of housing 12, ground structures on antenna resonating element 70, etc.).

As shown in FIG. 4, antenna 26 may be connected to a connector such as radio-frequency connector 88 on printed circuit board 84 by transmission line 44. Transceiver circuitry 23 may be mounted to printed circuit board 84 and may be connected to the conductive lines in transmission line 44 via connector 88 and traces in board 84. Transmission line 44 may have positive and ground conductors and may be used in conveying radio-frequency antenna signals between transceiver 23 and antenna 26.

Antenna window 68 may be formed by placing a dielectric antenna window in an opening of housing 12. With the illustrative arrangement shown in FIG. 4, antenna window 68 has been formed by forming slots 82 through a conductive housing structure (e.g., an upper conductive housing wall in housing 12). The longitudinal axis of each slot 82 may run into the page in the orientation of FIG. 4 (as an example).

Electrical components 86 and antenna 26 may be mounted in close proximity to each other within housing 12 of device 10. This gives rise to the potential for electromagnetic interference between components 86 and antenna 26. The presence of antenna cavity 72 may help to reduce electromagnetic interference and may improve antenna efficiency by helping to direct radio-frequency antenna signals through slots 82 in antenna window 68.

Figure 5:
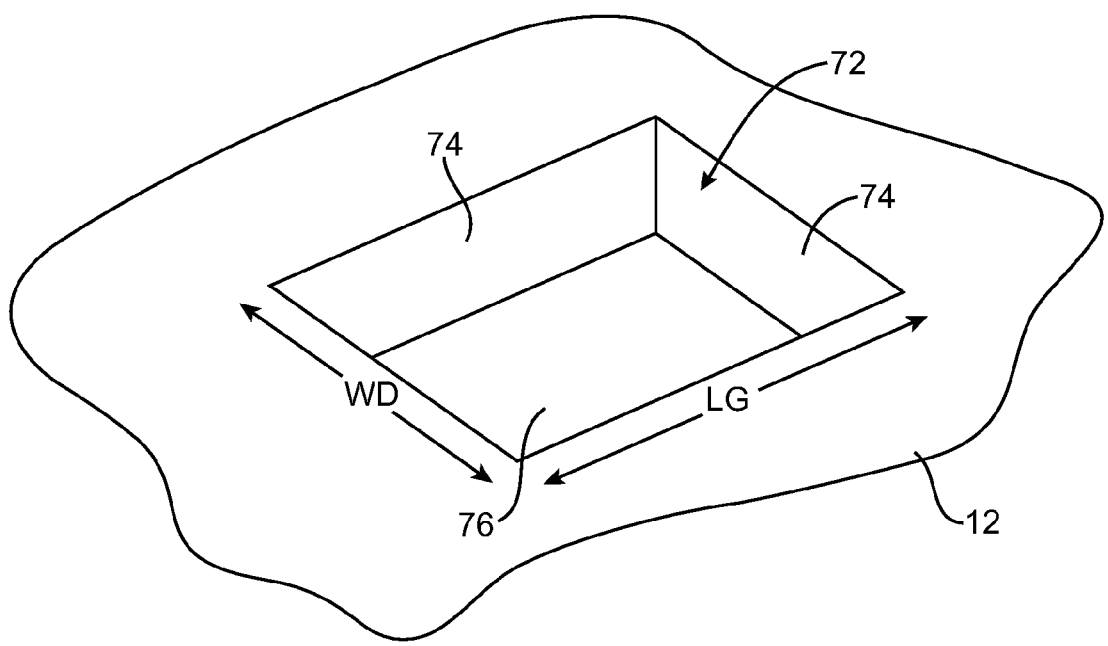
FIG. 5 is a perspective view of an illustrative antenna cavity in accordance with an embodiment of the present invention.

An illustrative configuration for antenna cavity 72 is shown in FIG. 5. As shown in FIG. 5, antenna cavity 72 may have a substantially rectangular shape with four conductive vertical sidewalls 74 and planar lower conductive surface 76. Antenna cavity 72 may have a rectangular opening shape with a length LG that is longer than its width WD (as an example). Portions of antenna cavity 72 may, if desired, be formed from conductive housing structures (e.g., part of a machined metal housing 12). Antenna cavities may also be formed from metal traces on a dielectric support structure, from pieces of foil, from stamped or cast metal parts, etc.

Figure 6:
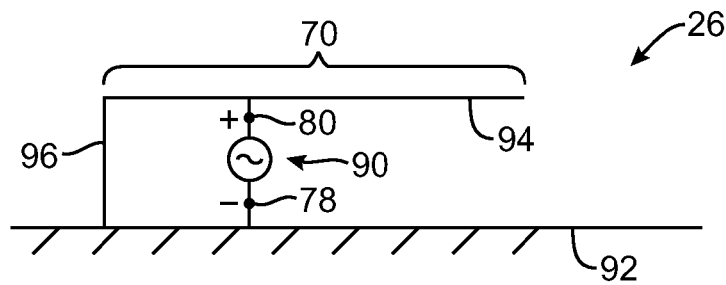
FIG. 6 is a schematic diagram of an illustrative antenna based on an inverted-F antenna resonating element in accordance with an embodiment of the present invention.

Illustrative antenna structures that may be used in forming resonating elements 70 for antennas such as antenna 26 of FIG. 4 include inverted-F antenna structures such as the inverted-F antenna structure of FIG. 6. Antenna 26 of FIG. 6 may be fed by radio-frequency source 90 (transceiver 23) at positive antenna feed terminal 80 and ground antenna feed terminal 78. Positive antenna feed terminal 80 may be coupled to antenna resonating element 70. Ground antenna feed terminal 78 may be coupled to ground element 92. Resonating element 70 may have a main arm 94 and a shorting branch 96 that connects main arm 94 to ground 92. Ground 92 may be shorted to cavity 72.

Figure 7:
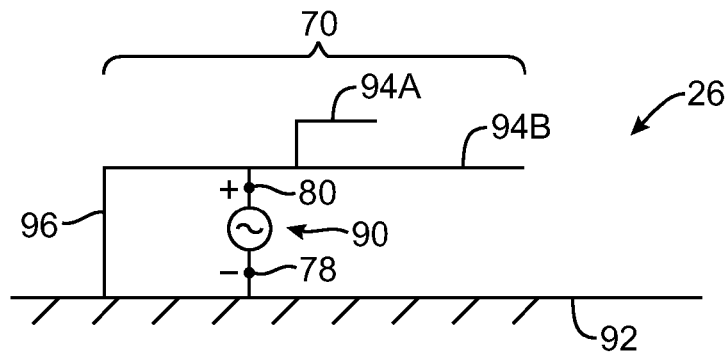
FIG. 7 is a schematic diagram of an illustrative antenna based on an inverted-F antenna resonating element with multiple branches in accordance with an embodiment of the present invention.

FIG. 7 shows an illustrative configuration that may be used for the antenna structures of antenna 26 in which resonating element 70 has multiple arms. In the FIG. 7 example, antenna resonating element 70 has shorter arm 94A and longer arm 94B. Because arm 94A is shorter than arm 94B, arm 94A is associated with higher frequencies of operation than arm 94B. By using two or more separate resonating element structures of different sizes, antenna resonating element 70 can be configured to cover a wider bandwidth or more than a single communications band of interest.

Figure 8:
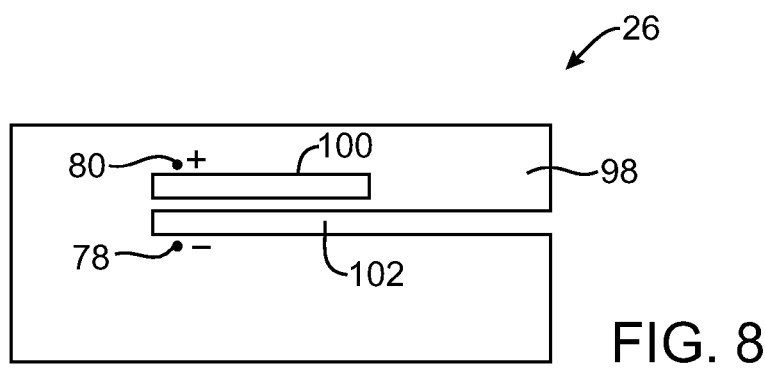
FIG. 8 is a diagram of an illustrative antenna based on a slot antenna resonating element in accordance with an embodiment of the present invention.

In the example of FIG. 8, conductive antenna structures 98 are configured to define a closed slot 100 and an open slot 102. The antenna formed from structures 98 of FIG. 8 may be fed using positive antenna feed terminal 80 and ground antenna feed terminal 78. In this type of arrangement, slots 100 and 102 serve as antenna resonating element structures for antenna 26. The sizes of the antenna resonating element slots and their open and closed shapes may be selected so that antenna 26 operates in desired communications bands (e.g., 2.4 GHz and 5 GHz, etc.).

Figure 9:
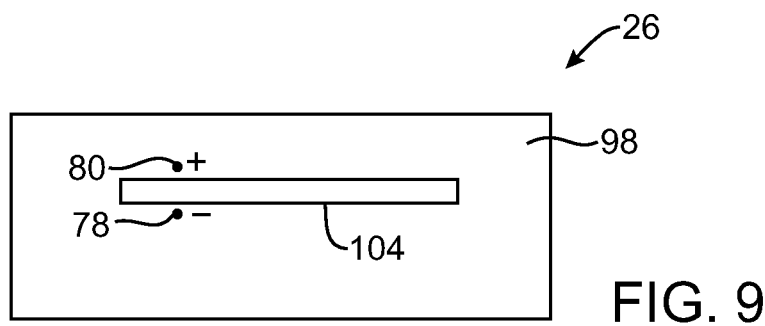
FIG. 9 is a diagram of an illustrative antenna based on a slot antenna resonating element having multiple slots in accordance with an embodiment of the present invention.

Another possible configuration for antenna 26 is shown in FIG. 9. In the arrangement of FIG. 9, antenna 26 has a single slot 104. Antenna 26 of FIG. 9 may be fed using positive antenna feed terminal 80 and ground antenna feed terminal 78. Ground 78 may be associated with housing 12 or other suitable ground plane elements in device 10 such as the walls of conductive cavity 72.

Figure 10:
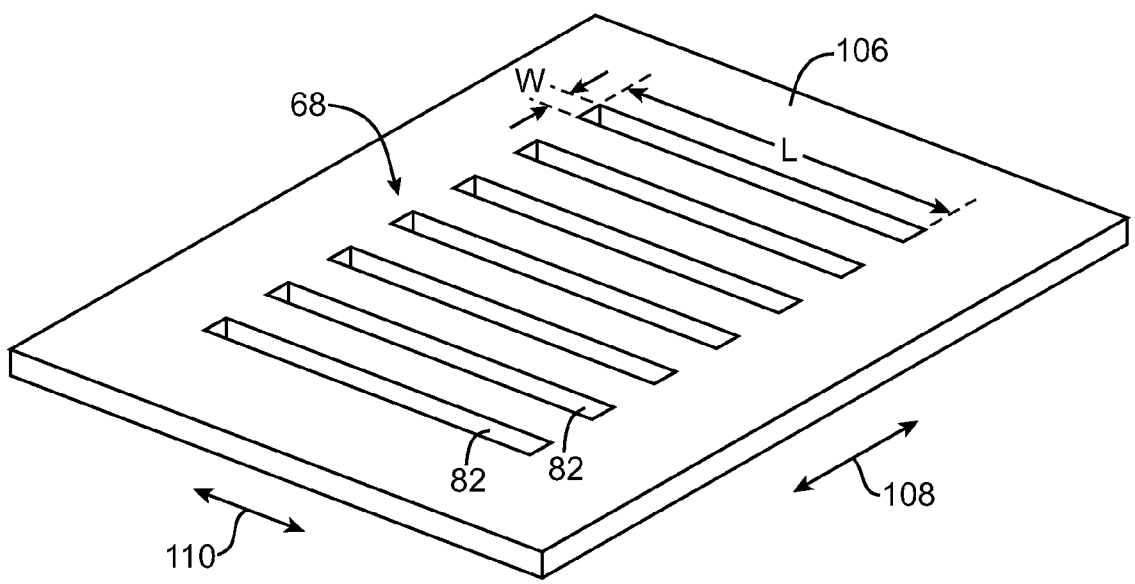
FIG. 10 is a perspective view of an illustrative slot-based antenna window in accordance with an embodiment of the present invention.

Antenna windows such as antenna window 68 of FIG. 4 may be formed from slots in a conductive surface that covers antenna resonating element 70. An illustrative slot-based antenna window is shown in FIG. 10. As shown in FIG. 10, slot-based antenna window 68 may be formed from openings 82 in conductive surface 106.

Conductive surface 106 may be any conductive surface associated with electronic equipment such as electronic device 10 (e.g., a handle surface, a surface associated with a base or other support structure, a cover plate, a portion of an electronic component, etc.). In a typical scenario, conductive surface 106 is a substantially planar external conductive housing surface. Such conductive structures are sometimes referred to as device housings, devices cases, housing or case walls, housing or case surfaces, etc.

Openings 82 may be filled with a gaseous dielectric such as air or a solid dielectric such as plastic or epoxy. An advantage of filling openings 82 with a solid dielectric material is that this may help prevent intrusion of dust, liquids, or other foreign matter into the interior of device 10.

Openings 82, which are sometimes referred to as slots or microslots, may have any suitable shape (e.g., shapes with curved sides, shapes with bends, circular or oval shapes, non-rectangular polygonal shapes, combinations of these shapes, etc.). In a typical arrangement, which is described herein as an example, slots 82 may be substantially rectangular in shape and may have narrower dimensions (i.e., widths W measured parallel to lateral dimension 108) and longer dimensions (e.g., lengths L measured parallel to longitudinal slot dimension 110). This is merely illustrative. Slots 82 may have any suitable non-rectangular shapes (e.g., shapes with non-perpendicular edges, shapes with curved edges, shapes with bends, etc.). The use of substantially rectangular slot configurations is only described herein as an example.

Whether straight, curved, or having shapes with bends, the widths (i.e., the narrowest lateral dimensions) of slots 82 are generally much less than their lengths. For example, the widths of slots 82 are typically on the order of microns, tens of microns, or hundreds of microns (e.g., 5-200 microns, 10-30 microns, less than 100 microns, less than 50 microns, less than 30 microns, etc.), whereas the lengths of slots 82 are typically on the order of millimeters or centimeters (e.g., 5 mm or more, 10 mm or more, 15 mm or more, etc.). With one suitable arrangement, the lengths of slots 82 may be selected so that the slots are longer than a half of a wavelength at a desired antenna operating frequency (e.g., the lowest frequency associated with the communications bands being used). This helps to prevent slots 82 from resonating at the antenna operating frequency and thereby allows slots 82 to form a structure for antenna window 68 that is transparent to radio-frequency antenna signals at the operating frequencies of the antenna. If desired, the length of slots 82 may be selected so that the frequency response of the slots allows the slots to serve as a tuning element (e.g., a length-dependent tuning element in the lower frequency band).

Slots 82 that have particularly small widths (e.g., tens of microns) are generally invisible to the naked eye under normal observation. Slots 82 that have somewhat larger widths (e.g., hundreds of microns) may be barely visible, but will generally be unnoticeable under normal observation. For example, on a shiny metallic surface of a laptop computer, window 68 may be barely visible in the form of a slight change in the sheen of the surface when viewed from an oblique angle. The use of narrow slots 82 to form antenna window 68 therefore allows window 68 to be located in prominent device locations without becoming obtrusive. For example, antenna window 68 may be formed on normally exposed portions of housing 12. Examples of normally exposed housing portions include the exterior surfaces of a laptop computer or other device 10, surfaces of a laptop computer such as the housing surface adjacent to the keyboard or display (e.g., when the cover of a laptop computer has been opened for use), or housing sidewalls (see, e.g., antenna locations 56 and 58 of FIG. 1A, antenna locations 60 and 62 of FIG. 1B, and antenna locations 65, 66, and 67 of FIG. 2B).

In the example of FIG. 10, there are seven antenna window slots 82 in antenna window 68. This is merely illustrative. Antenna window 68 may have any suitable number of slots. For example, window 68 may have about 7-13 slots, 4-20 slots, more than 5 slots, more than 10 slots, more than 15 slots, etc. If desired, antenna window 68 may have smaller numbers of slots (e.g., 1-3 slots). In general, however, larger numbers of slots are helpful in increasing the transparency of the antenna window to radio-frequency antenna signals and may therefore be preferred.

Slots 82 may be spaced apart by any suitable amount. As an example, there may be about 1 to 1.5 mm, 0.5 to 2 mm, or 0.25 to 3 mm of lateral separation between adjacent pairs of slots. These are merely illustrative examples. Slots 82 may be separated by any suitable distance (e.g., less than 0.5 mm, less than 1 mm, less than 2 mm, more than 2 mm, etc.). An advantage of providing adequate separation (e.g., about 1 mm) between adjacent slots is that this helps the antenna window structure from becoming fragile due to an excessive density of slots.

The spacings between the slots in a given antenna window need not be uniform. For example, some slots may be spaced apart by 1 mm lateral separations and other slots may be spaced apart by 1.5 mm lateral separations. In other suitable configurations, each pair of adjacent slots may be separated by a different distance. Combinations of these slot spacing schemes may also be used.

If desired, the slots in antenna window 68 may have non-uniform lengths L. For example, each slot 82 may have a different length. Alternatively, some slots may have the same length and other slots may have different lengths. Slots 82 may also have different widths. The use of different combinations of slot widths, slot lengths, slot spacings, and slots shapes may be helpful when forming an antenna window around an obstacle in a given electronic device conductive surface or when forming a particular pattern of slots. Slot widths in antenna window 68 may, if desired, be made large enough to form a visible pattern on the surface of device 10 (e.g., to form a logo or other desirable antenna window pattern). In general, however, it is advantageous to ensure that the slots in window 68 are narrow enough to be invisible or unnoticeable to the naked eye under normal observation.

Slots 68 may be formed using any suitable technique. For example, slots may be machined in metal walls or other conductive wall structures in housing 12 using laser cutting, plasma arc cutting, micromachining (e.g., using grinding tools), or other suitable techniques.

Antenna cavities such as antenna cavity 72 of FIG. 4 may be formed from portions of housing 12, other conductive portions of device 10, stamped, cast, or machined cavity structures, or any other suitable conductive structures. With one suitable arrangement, which is sometimes described herein as an example, the shape of antenna cavity 72 may be at least partly determined by the shape of an underlying dielectric support structure. Conductive layers of material may be formed on the dielectric support structure to form antenna cavity 72. An example of this type of arrangement is shown in FIG. 11.

Figure 11:
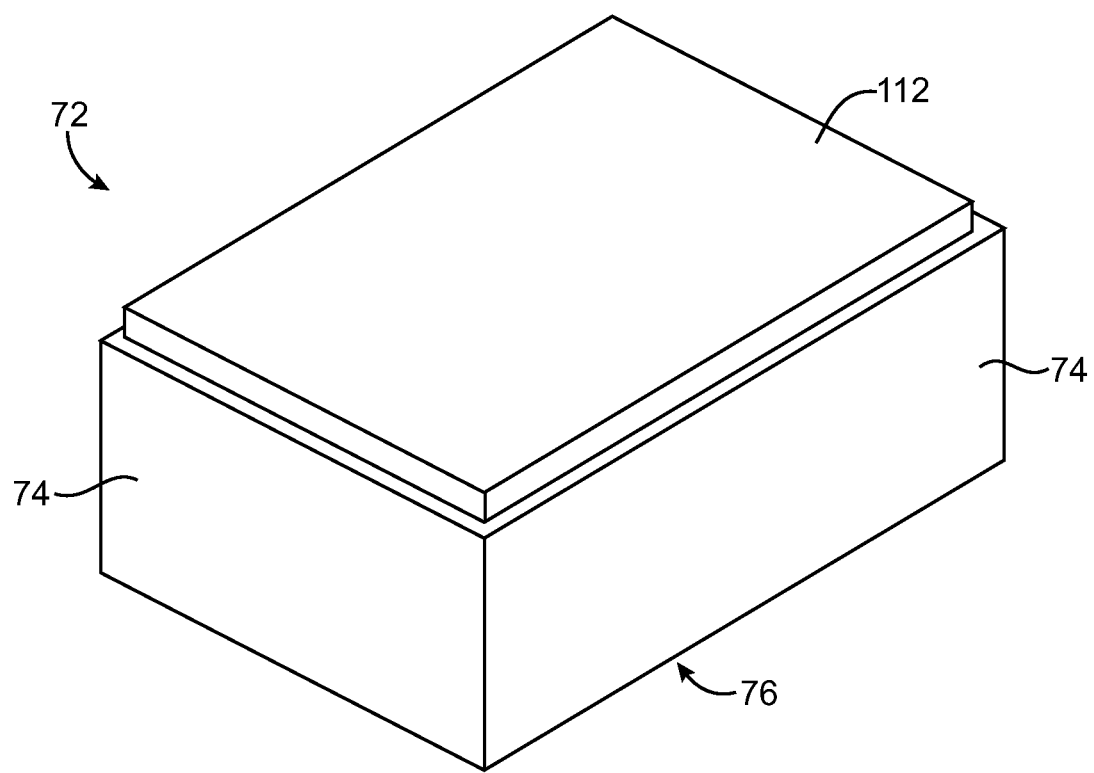
FIG. 11 is a perspective view of an illustrative antenna cavity formed from a plastic support on which conductive cavity walls have been formed in accordance with an embodiment of the present invention.

As shown in FIG. 11, antenna cavity 72 may have a dielectric support structure 112. Support structure 112 may be formed from plastic or other suitable dielectric materials. Examples of plastic materials that may be used in forming support structure 112 include polycarbonate, acrylonitrile butadiene styrene (ABS) plastic, blends of plastic such as PC/ABS plastic, etc. Support structure 112 may be solid or hollow or may have both solid and hollow portions. In the example of FIG. 11, support structure 112 has a substantially solid rectangular shape. This is merely illustrative. Support structure 112 may have curved shapes, shapes that include curved and planar surfaces, closed shapes (e.g., shapes with no openings to an interior hollow portion), open shapes (e.g., shapes with an upper opening that exposes an internal hollow cavity region), etc.

In the FIG. 11 example, support structure 112 has a rectangular shape with four vertical sidewalls and upper and lower planar surfaces. Layers of conductive materials such as copper or other metals are formed on the surfaces of the four vertical sidewalls of support structure 112 and the lower planar surface of support structure 112. These conductive layers form vertical cavity sidewalls 74 and lower planar wall 76 for antenna cavity 72. An antenna resonating element such as antenna resonating element 70 of FIG. 4 may be mounted on the exposed upper surface of support structure 112. In configurations in which support structure 112 has an opening in place of its upper surface, antenna resonating element 70 may be mounted within the opening or elsewhere in cavity 72.

Any suitable fabrication technique may be used for forming conductive antenna cavity surfaces on an antenna cavity support structure such as support structure 112 of FIG. 11. As an example, metal can be deposited by evaporation, sputtering, or other physical vapor deposition techniques. Electrochemical deposition techniques may also be used (e.g., copper electroplating). Undesired portions of conductive layers can be removed by etching or other suitable techniques. Conductors on support structure 112 can also be patterned by selective growth techniques (e.g., by depositing a seed metal layer in a desired pattern prior to building up the metal to a desired thickness using electroplating).

Figure 12:
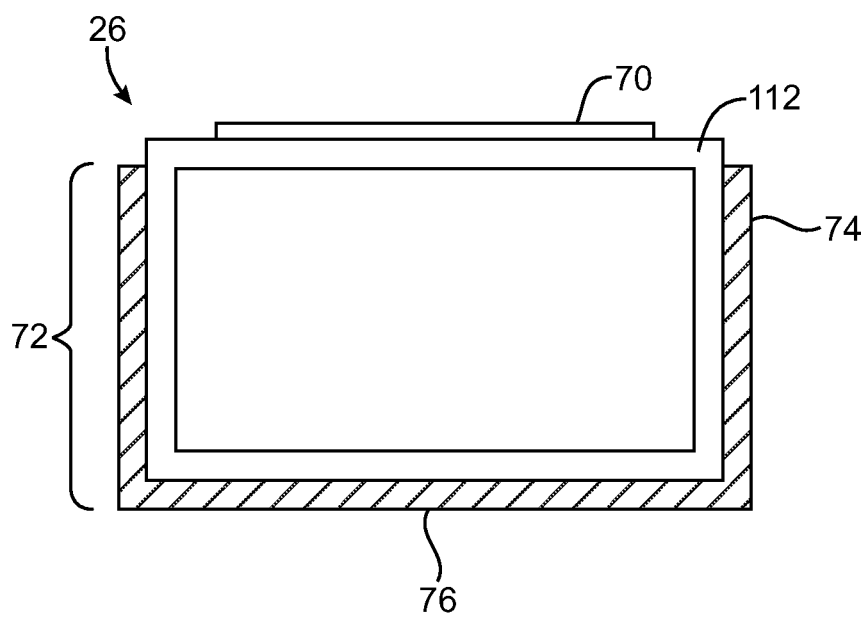
FIG. 12 is cross-sectional side view of an illustrative antenna formed from an antenna cavity having a plastic support with conductive cavity walls in accordance with an embodiment of the present invention.

A cross-sectional side view of an illustrative antenna 26 with a cavity formed on a dielectric support such as support 112 of FIG. 11 is shown in FIG. 12. As shown in FIG. 12, antenna resonating element 70 may be formed on the upper surface of support structure 112. Antenna cavity 72 may be formed from conductive layers on support 112 such as sidewall layers 74 and rear planar layer 76. Antenna resonating element 70 may be formed from conductive traces on the surface of support 112 (e.g., copper traces formed directly on a plastic support surface) or may be formed by mounting a patterned rigid or flexible printed circuit board to support 112 (as examples).

Figure 13:
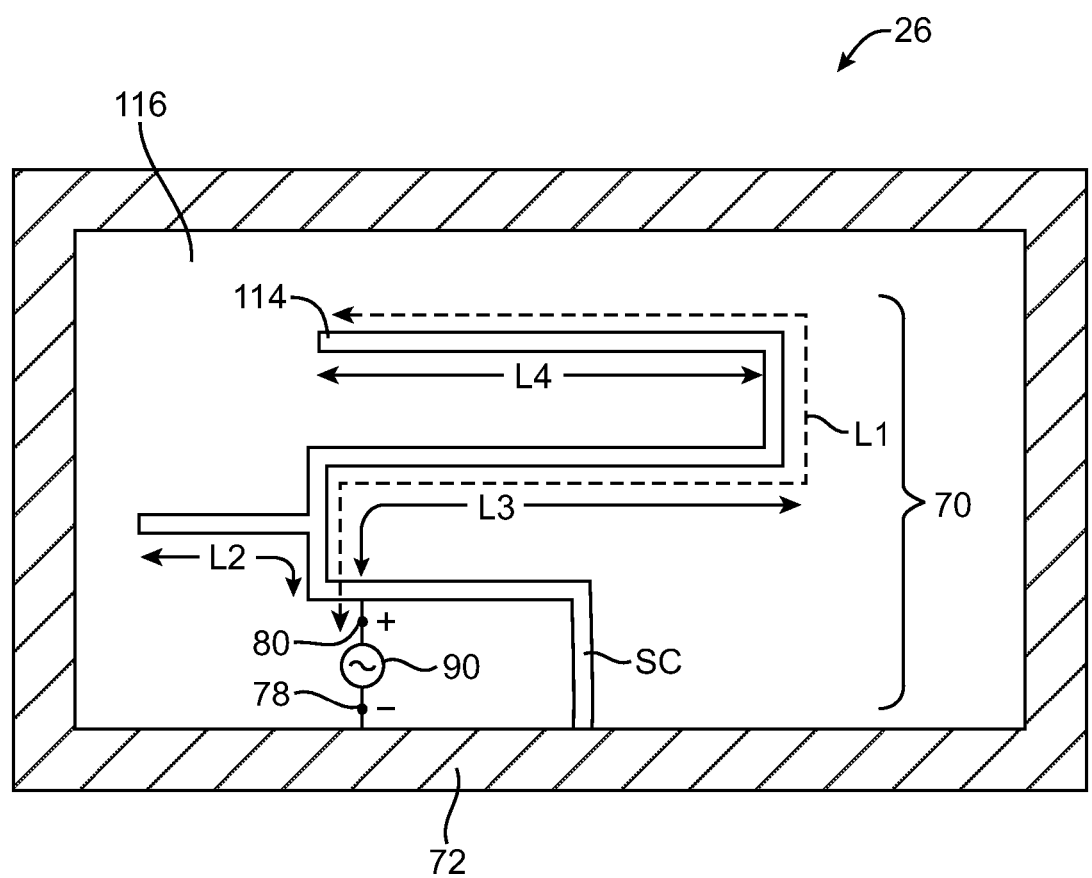
FIG. 13 is a top view of an illustrative antenna resonating element that may be used in a cavity antenna in accordance with an embodiment of the present invention.

An illustrative pattern of conductive traces that may be used to form antenna resonating element 70 in antenna 26 is shown in FIG. 13. In the example of FIG. 13, antenna resonating element 70 has been formed from conductive traces 114 on printed circuit board substrate 116. Substrate 116 is surrounded by antenna ground structures such as the upper portions of the vertical walls of antenna cavity 72. Antenna 26 may be fed by source 90 (transceiver circuitry 23) using positive antenna feed terminal 80 and ground antenna feed terminal 78. Positive antenna feed terminal 80 may be coupled to antenna resonating element trace 114. Ground antenna feed terminal 78 may be coupled to antenna ground (e.g., cavity 72).

Antenna resonating element 70 of FIG. 13 has an inverted-F configuration in which the feed terminals 80 and 78 are located partway down the main arm of the antenna resonating element from short circuit branch SC. The main arm of trace 114 has branches that form associated lengths L1, L2, L3, and L4 each of which contributes to the frequency response of antenna 26. The frequency response of antenna resonating element 70 and antenna 26 can therefore be adjusted to cover communications bands of interest and to provide desired bandwidth by appropriate selection of the size and shape of trace 114 (e.g., the lengths L1, L2, L3, and L4).

Figure 14:
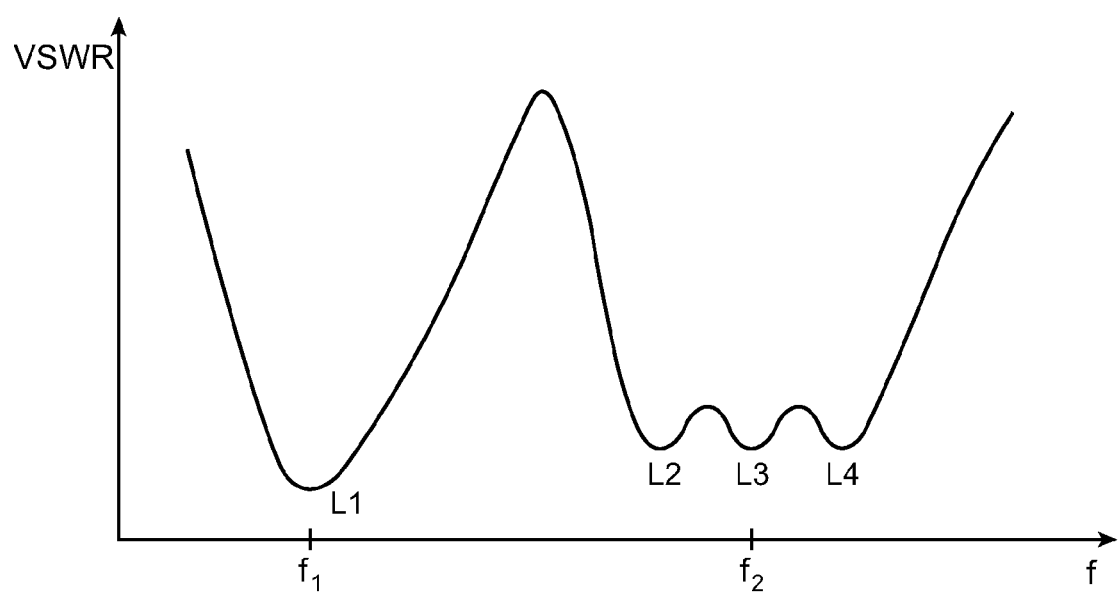
FIG. 14 is a graph of an illustrative antenna frequency response that may be exhibited by a cavity antenna with an antenna resonating element of the type shown in FIG. 13 in accordance with an embodiment of the present invention.

A graph in which the antenna response for an antenna formed using an antenna resonating element such as element 70 of FIG. 13 is shown in FIG. 14. In the graph of FIG. 14, antenna response (voltage standing wave ratio—VSWR) is plotted as a function of operating frequency f. In this example, antenna 26 has been configured to cover two communications bands. The lower communications band covers frequency f1 and is associated with long trace length L1. The upper communications band covers frequency f1. The bandwidth of the upper communications band is influenced by the different arm lengths L2, L3, and L4 of antenna resonating element 70 (FIG. 13) and has been configured so that the upper communications band has a relatively wide bandwidth. The lower and upper communications bands may correspond to 2.4 GHz and 5 GHz bands (e.g., for WiFi) or any other suitable communications bands. Antenna 26 can also be configured to handle only a single band or more than two communications bands if desired. The example of FIGS. 13 and 14 is merely illustrative.

Figure 15:
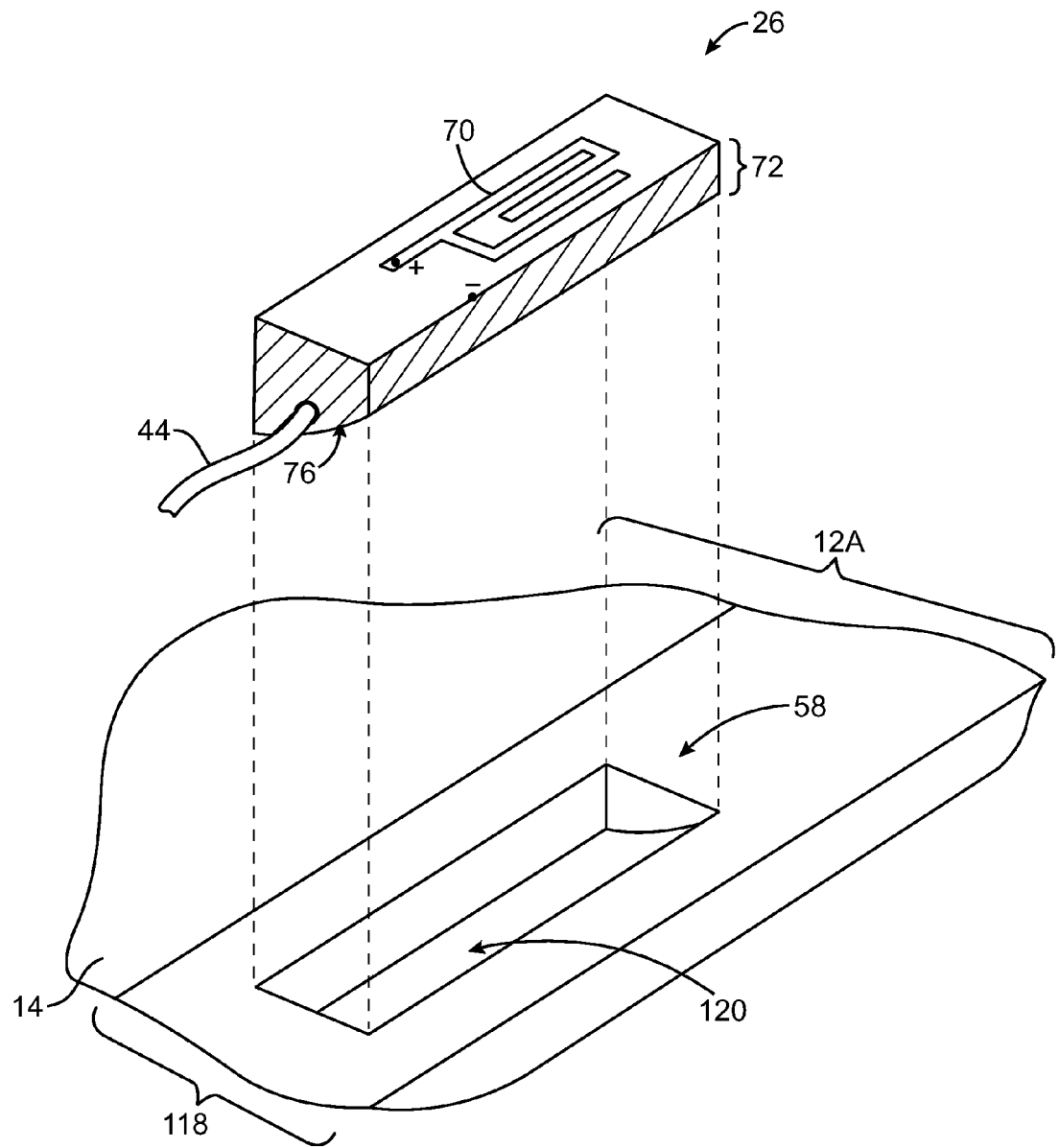
FIG. 15 is an exploded perspective view of a cavity antenna fed by an inverted-F resonating element in an electronic device in accordance with an embodiment of the present invention.

If desired, antenna 26 may be mounted in a peripheral region on upper housing 12A (i.e., in region 58 of FIG. 1A). An illustrative configuration that may be used for antenna 26 when mounted in this location is shown in FIG. 15. As shown in FIG. 15, antenna cavity 72 may have a curved lower surface 76 that mates with a corresponding curved surface in recess 120. Recess 120 may be, for example, a sunken portion of peripheral housing region 118 of upper housing 12A. Recess 120 may be formed in an opening in a plastic bezel, in an opening in a metal housing wall or other housing structure, using frame members and other internal housing members, using parts of a housing, using a separate support structure (e.g., a dielectric insert or frame member), using other suitable device structures, or using combinations of these structures.

Once mounted in region 58 of housing 12A or in other suitable portions of device 10, antenna 26 may be covered with a dielectric (e.g., a portion of a display screen glass panel, a plastic bezel member, a dielectric antenna window, a slot-based antenna window in a conductive housing member or other conductive structure, etc.).

Figure 16:
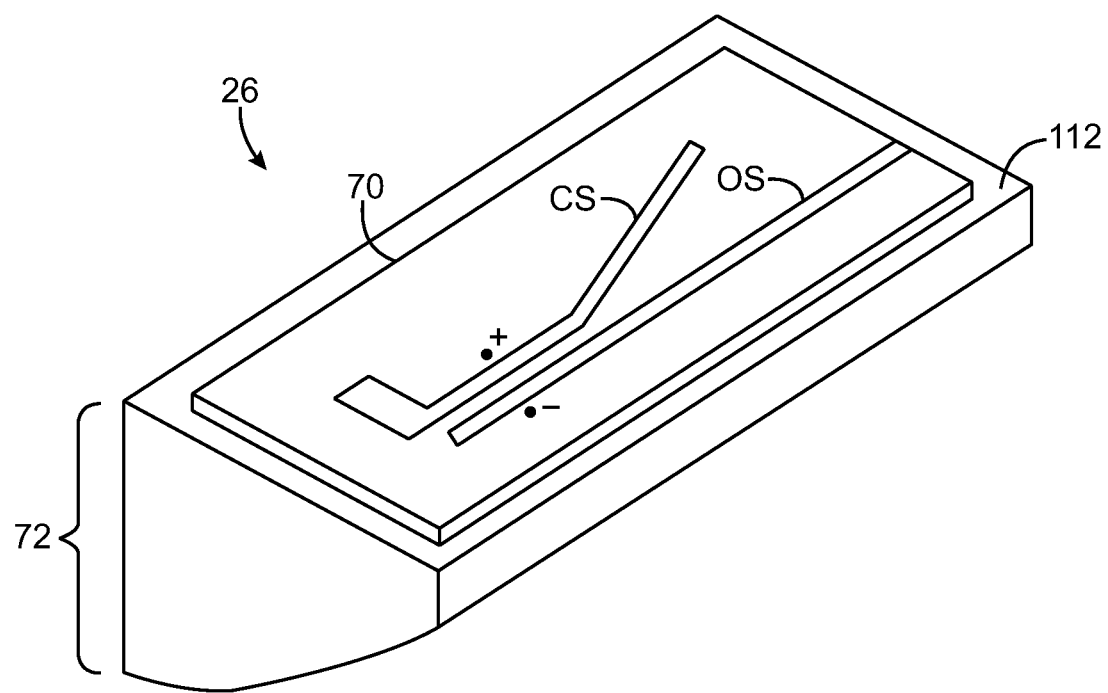
FIG. 16 is a perspective view of a slot-based cavity antenna for an electronic device in accordance with an embodiment of the present invention.

FIG. 16 shows how a curved antenna cavity such as cavity 72 may be provided with a slot-based antenna resonating element. In the FIG. 16 example, antenna resonating element 70 has an open slot OS and a closed slot CS. Antenna resonating element 70 may, in general, have any suitable number of closed slots, any suitable number of open slots, and, if desired, additional resonating element structures (e.g., conductive traces that form resonating element arm branches of the type described in connection with FIG. 13, etc.). The two slot configuration of FIG. 16 is merely illustrative.

Figure 17:
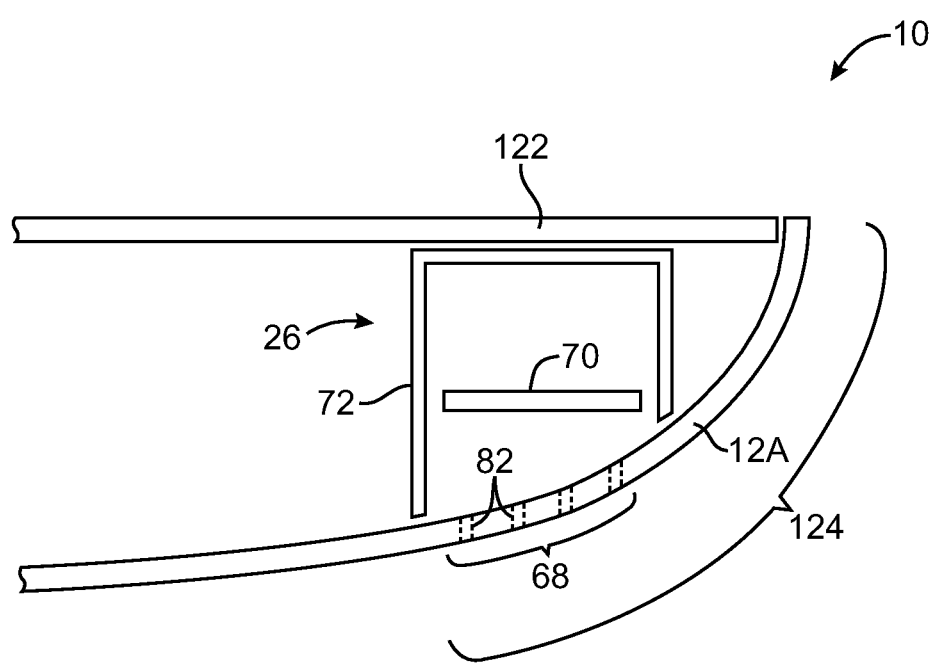
FIG. 17 is a cross-sectional side view of a cavity antenna and an associated slot-based antenna window that allows radio-frequency antenna signals to pass through a curved portion of an electronic device housing in accordance with an embodiment of the present invention.

As shown in FIG. 17, device 10 may have an upper housing 12A with a curved edge portion such as portion 124. Slot-based antenna window 68 may be formed in region 124 from slots 82. Antenna resonating element 70 and antenna cavity 72 of antenna 26 may be formed adjacent to window 68. Member 122 may be a cover glass for display 14, a plastic cover, a conductive housing member, or other suitable structures for device 10 and housing 12. The curved edge portion of housing 12A and the rest of housing 12A in FIG. 17 may be, for example, machined aluminum.

Figure 18:
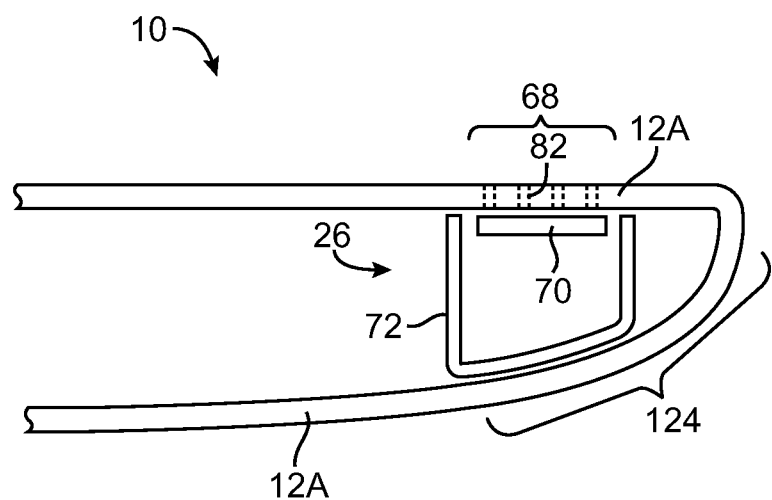
FIG. 18 is a cross-sectional side view of a cavity antenna and an associated slot-based antenna window that allows radio-frequency antenna signals to pass through a planar surface of an electronic device housing in accordance with an embodiment of the present invention.

As shown in FIG. 18, antenna 26 can be oriented so that antenna window 68 is formed on a planar inner surface of housing portion 12A, rather than on a curved outer surface of housing portion 12A in region 124.

Figure 19:
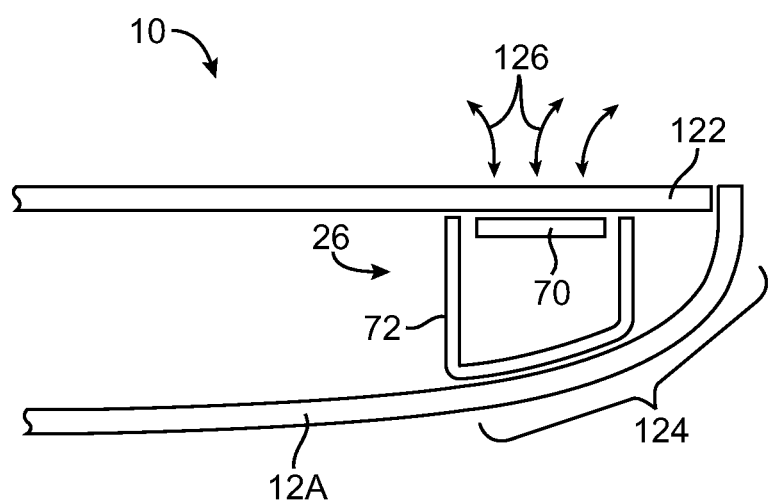
FIG. 19 is a cross-sectional side view of a cavity antenna that transmits and receives radio-frequency antenna signals through a planar dielectric portion of an electronic device in accordance with an embodiment of the present invention.

It is not necessary for antenna 26 to be provided with a slot-based antenna window. As shown in FIG. 19, for example, device 10 may have a housing such as upper housing 12A in which a dielectric member is mounted such as dielectric member 122. Dielectric member 122 may be, for example, a planar dielectric member such as a sheet of cover glass or plastic that is used to cover the exposed surface of display 14 (FIG. 1). Antenna 26 may be oriented so that radio-frequency signals associated with antenna resonating element 70 and antenna cavity 72 may pass through a portion of dielectric member 122, as indicated schematically by arrows 126. Antenna 26 of FIG. 19 may be mounted in curved peripheral region 124 of housing portion 12A or other suitable portions of device 10.

The foregoing is merely illustrative of the principles of this invention and various modifications can be made by those skilled in the art without departing from the scope and spirit of the invention.

What is claimed is:

1. An electronic device, comprising:
   a housing having a curved housing surface; and
   a cavity-backed antenna mounted in the housing that includes an antenna cavity formed from a dielectric support structure covered with a layer of conductive material and an antenna resonating element, wherein the layer of conductive material comprises a curved conductive wall formed opposite to the antenna resonating element, wherein the curved conductive wall extends parallel to the curved housing surface, wherein the dielectric support structure forms a separate structure from the housing and wherein the antenna resonating element comprises a multi-branch inverted-F antenna resonating element formed from conductive antenna traces on a printed circuit board, and wherein the housing is an integral piece that encloses the dielectric support structure.

2. The electronic device defined in claim 1 wherein the dielectric support structure comprises a plastic support structure and wherein the layer of conductive material comprises metal.

3. The electronic device defined in claim 2 wherein the conductive antenna traces form an inverted-F antenna resonating element arm having at least two branches.

4. The electronic device defined in claim 2 further comprising:
   radio-frequency transceiver circuitry; and
   a transmission line that couples the radio-frequency transceiver circuitry to the cavity-backed antenna.

5. The electronic device defined in claim 4 wherein the cavity-backed antenna comprises a positive antenna feed terminal connected to the conductive antenna traces and comprises a ground antenna feed terminal connected to the layer of conductive material.

6. The electronic device defined in claim 2 wherein the printed circuit board comprises a flex circuit and wherein the conductive antenna traces and the layer of conductive material comprise copper.

7. The electronic device defined in claim 1 wherein the housing comprises a conductive housing wall having antenna window slots that form a slot-based antenna window for the cavity antenna.

8. The electronic device defined in claim 7 wherein the conductive housing wall comprises a curved portion of a portable computer lid.

9. The electronic device defined in claim 7 wherein the antenna window slots are less than 100 microns in width and are more than 5 mm in length.

10. The electronic device defined in claim 7 wherein the antenna window slots are filled with a solid dielectric.

11. An antenna in an electronic device housing having a curved housing surface, the antenna comprising:
   a dielectric support structure;
   a metal layer on the dielectric support structure that forms a conductive antenna cavity, wherein the conductive antenna cavity has a curved conductive wall formed from part of the metal layer; and
   an antenna resonating element having a printed circuit board with an inverted-F antenna resonating element trace, wherein the curved conductive wall is formed opposite to the antenna resonating element, and wherein the curved conductive wall extends parallel to the curved housing surface.

12. The antenna defined in claim 11 further comprising a slot-based antenna window that is located adjacent to the conductive antenna cavity and the antenna resonating element.

13. The antenna defined in claim 12 wherein the slot-based antenna window comprises a metal housing structure having a plurality of antenna window slots each having a width of less than 100 microns and each having a length of at least five millimeters.

14. The antenna defined in claim 13 wherein the inverted-F antenna resonating element trace has multiple branches and resonates in at least two communications bands.

15. A portable computer, comprising:
   an upper housing portion having a continuous metal housing structure;
   an antenna window formed from a plurality of antenna window slots in the metal housing structure
   a lower housing portion that is pivotably attached to the upper housing portion;
   radio-frequency transceiver circuitry;
   a transmission line that is coupled to the radio-frequency transceiver circuitry; and
   a cavity-backed antenna that is located under the antenna window, that is coupled to the transmission line, and that has an antenna cavity formed from a plastic support with vertical metal sidewalls and a rear metal layer, wherein the plastic support forms a separate structure from the upper and lower housing portions, and wherein the upper housing portion has a curved surface, the rear metal layer of the antenna cavity comprises a curved metal layer, and the curved metal layer extends parallel to the curved surface of the upper housing portion.

16. The portable computer defined in claim 15 wherein the upper housing portion has a curved edge region in which the antenna window slots are formed.

17. The electronic device defined in claim 1, wherein the dielectric support structure is solid.

18. The electronic device defined in claim 1, wherein the curved conductive wall is formed adjacent to the curved housing surface.

19. The electronic device defined in claim 18, wherein the curved conductive wall lies flush with the curved housing surface.

20. The antenna defined in claim 11, wherein the curved conductive wall lies flush with the curved housing surface.

21. The portable computer defined in claim 15, wherein the rear metal layer is formed adjacent to the curved surface of the upper housing portion.

* * * * *